April 28, 1970 J. A. PRYOR 3,508,413
LOW TEMPERATURE SEPARATION PROCESS OF NORMALLY GASEOUS
MATERIALS BY PLURAL STAGE PHASE SEPARATIONS
Original Filed Nov. 22, 1965 3 Sheets-Sheet 1

INVENTOR.
JOHN A. PRYOR
BY
Shanley & O'Neil
ATTORNEY

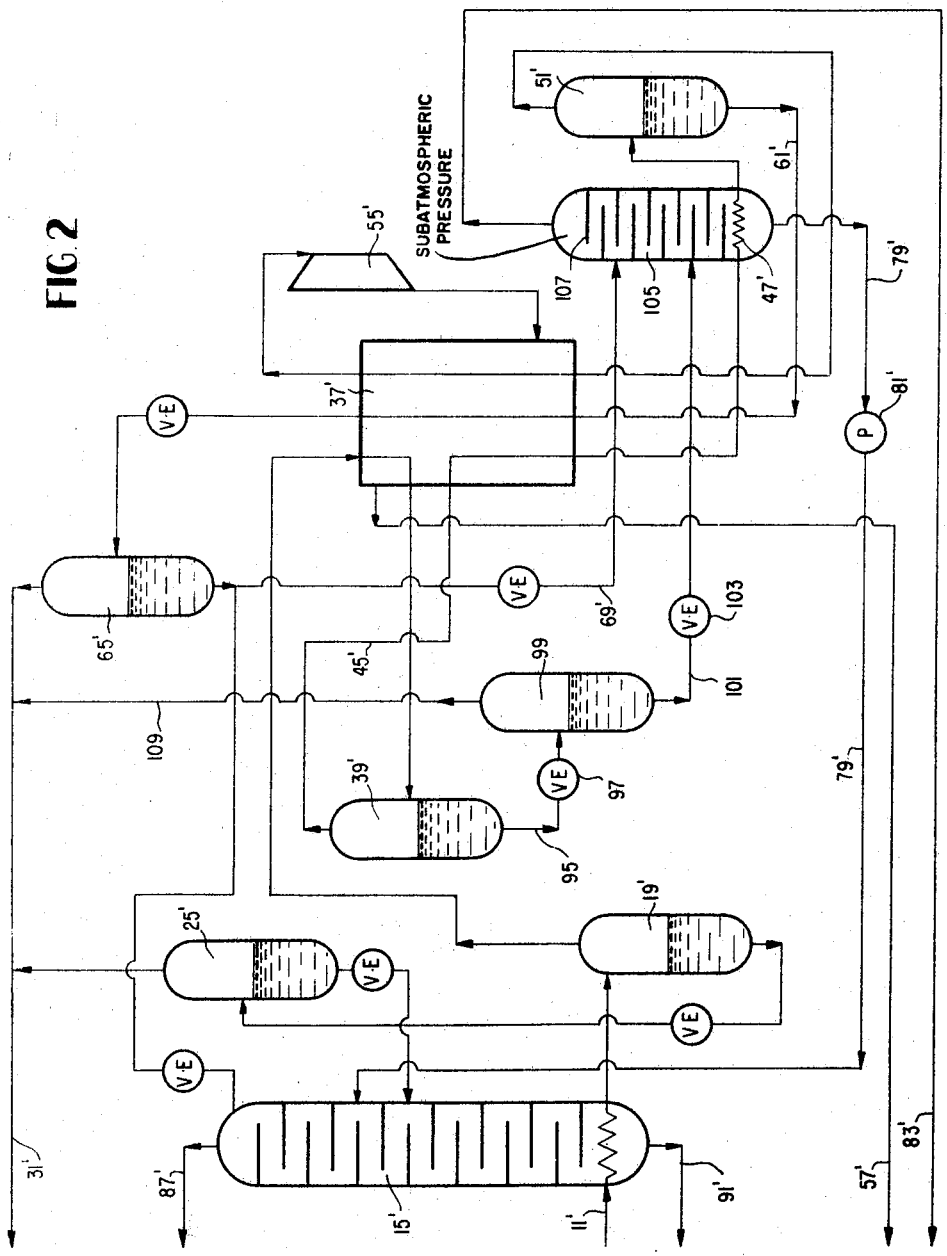

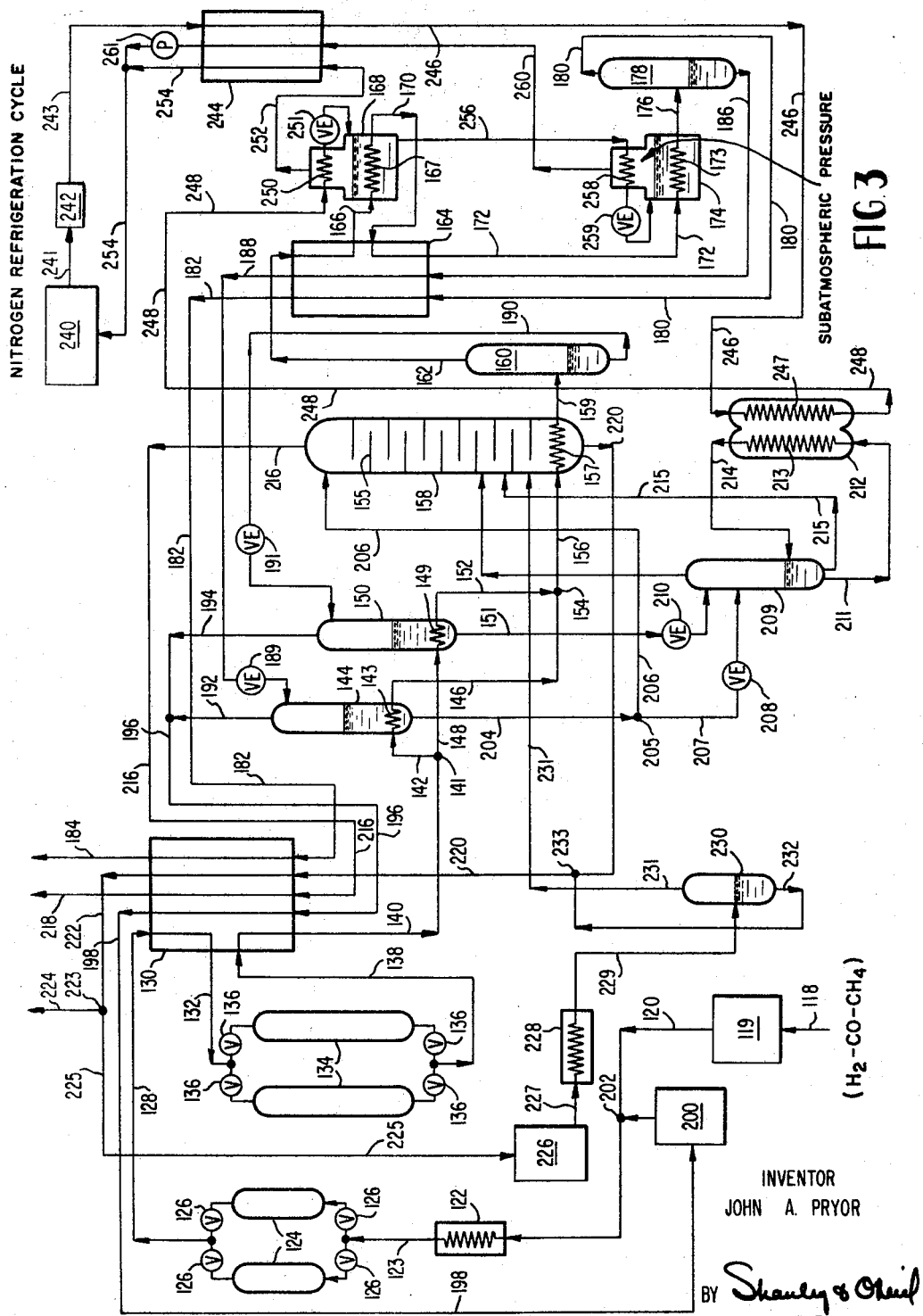

United States Patent Office 3,508,413
Patented Apr. 28, 1970

3,508,413
LOW TEMPERATURE SEPARATION PROCESS OF NORMALLY GASEOUS MATERIALS BY PLURAL STAGE PHASE SEPARATIONS
John A. Pryor, Emmaus, Pa., assignor to Air Products and Chemicals, Inc., Allentown, Pa., a corporation of Delaware
Application Nov. 22, 1965, Ser. No. 513,648, now Patent No. 3,319,429, dated May 16, 1967, which is a continuation-in-part of application Ser. No. 274,489, Apr. 22, 1963. Divided and this application Mar. 9, 1967, Ser. No. 646,771
Int. Cl. F25j 3/02
U.S. Cl. 62—24                      8 Claims

ABSTRACT OF THE DISCLOSURE

Low temperature process for separation of a gaseous mixture into components. A gaseous mixture containing components of different boiling points is compressed, cooled and passed through a sequence of liquefaction and separation steps in cycles characterized by high thermal efficiency and low power requirements, to effect separation of the mixture into streams rich in the respective components.

---

This is a division of copending application Ser. No. 513,648, filed Nov. 22, 1965, now U.S. Patent No. 3,319,-429, May 16, 1967, which is a continuation-in-part of copending application Ser. No. 274,489, filed Apr. 22, 1963, now abandoned.

The present invention relates to methods for separating the components of mixtures of normally gaseous materials, and more particularly, to methods for low temperature liquefaction and fractionation of mixtures of normally gaseous materials.

An object of the present invention is to provide methods for separating mixtures of normally gaseous materials, which are characterized by high thermal efficiency.

Another object of the present invention is the provision of methods for separating normally gaseous mixtures, which are characterized by relatively low power requirements.

Still another object of the present invention is the provision of methods for separating mixtures of hydrogen and carbon monoxide.

A further object of the present invention is the provision of methods for separating ternary gaseous mixtures.

Still another object of the present invention is the provision of methods for separating mixtures comprising hydrogen, carbon monoxide and methane.

Yet another object of the present invention is to provide improved low temperature methods for separating gaseous mixtures, in which part of the refrigeration required is supplied by evaporating a liquid, normally gaseous refrigerant under subatmospheric pressure.

Still a further object of the present invention is to provide improved methods for separating gaseous mixtures which will be relatively simple, reliable and inexpensive in practice.

The foregoing and other objects are accomplished by the invention, which in one embodiment can be briefly described as a low temperature process for separating components of a mixture including a relatively lower boiling, normally gaseous first component, a relatively intermediate boiling, normally gaseous second component and a relatively higher boiling, normally gaseous third component, comprising the steps of cooling and partially condensing compressed mixture to form a vapor rich in first component and a condensate rich in second component and containing third component, separating vapor rich in first component from condensate, passing at least a portion of the condensate to an evaporation zone, maintaining condensate in the evaporation zone under subatmospheric pressure, passing compressed mixture in heat exchange relationship with condensate in the separation zone to assist in cooling and partially condensing mixture, thereby partially vaporizing condensate under subatmospheric pressure to obtain a vapor rich in second component, and withdrawing vaporized condensate rich in second component to leave a liquid residue containing third component.

In another embodiment, the invention may be briefly described as a low temperature process for separating components of a mixture including a relatively lower boiling, normally gaseous first component and a relatively higher boiling, normally gaseous second component, comprising the steps of compressing and expanding a normally gaseous refrigerant in a closed cycle in which the refrigerant is compressed to a superatmospheric pressure, cooled to effect at least partial liquefaction thereof, and expanded to a subatmospheric pressure, compressing and cooling mixture, passing cooled, compressed mixture in heat exchange relationship with refrigerant evaporating under subatmospheric pressure to effect further cooling and at least partial condensation of mixture to form a vapor rich in first component and a condensate rich in second component, and separating vapor rich in first component from condensate rich in second component.

Other features, objects and advantages of the invention will appear more fully from the following detailed description which, when considered in connection with the accompanying drawings, discloses several embodiments of the invention for purposes of illustration only and not for definition of the limits of the invention. For determining the scope of the invention, reference may be had to the appended claims.

In the drawings, wherein similar reference characters denote similar elements throughout the several views;

FIGURE 2 is a partial diagrammatic showing of a modified form of the embodiment shown in FIGURE 1; and FIGURE 3 is a diagrammatic showing of a low temperature gas separation process that forms another embodiment of the invention.

Figure 1:
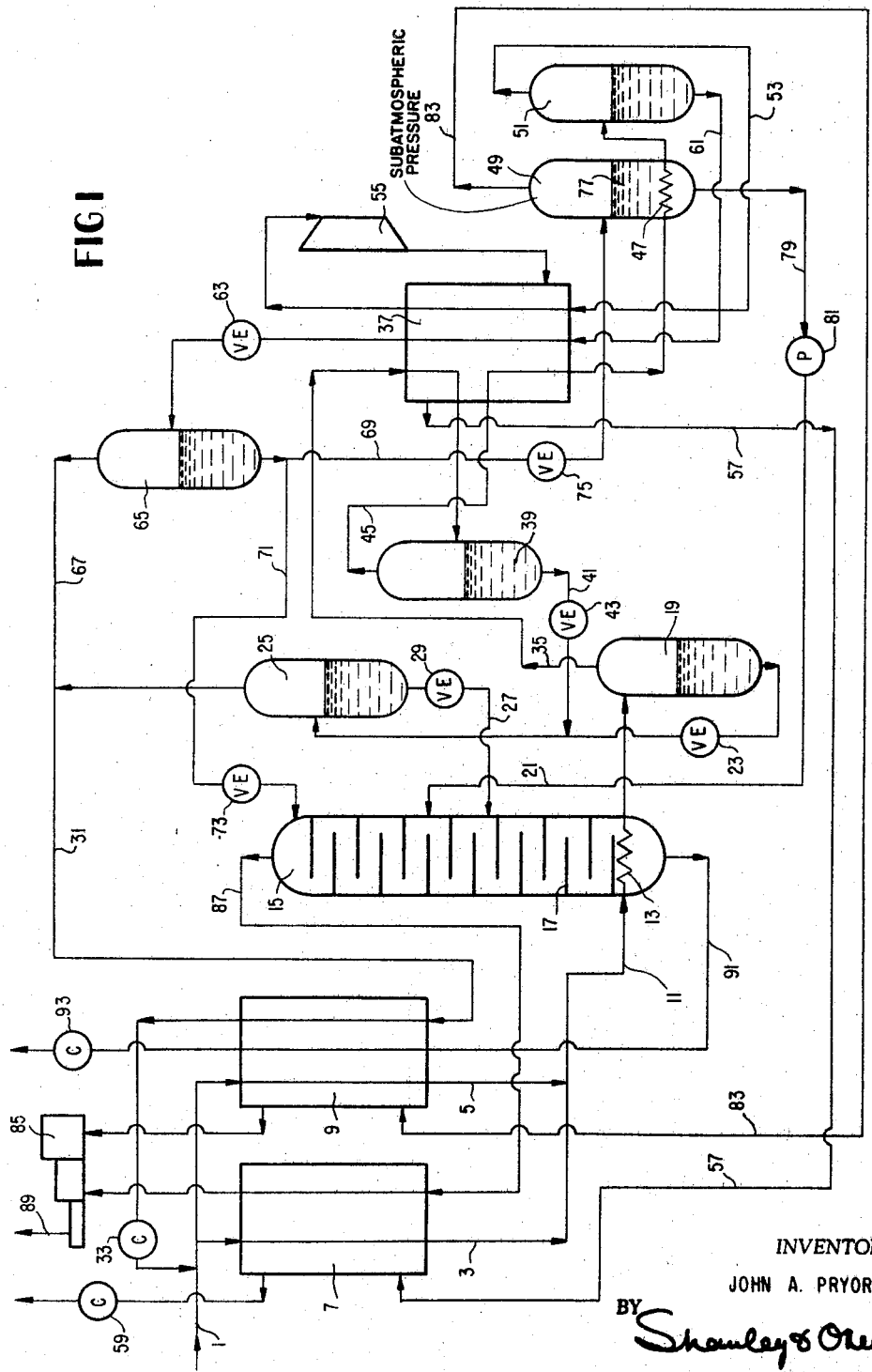
FIGURE 1 is a diagrammatic showing of a low temperature gas separation process that forms a preferred embodiment of the present invention.

Referring now to the drawings in greater detail, in FIGURE 1, a compressed feed gas mixture enters the system at a relatively high pressure through a conduit 1 and is divided and passes through a pair of branch conduits 3 and 5, which are in parallel with each other. The mixture in conduit 3 is cooled in heat exchanger 7 by returning gas streams, while the mixture in conduit 5 is similarly cooled in heat exchanger 9. The streams in conduits 3 and 5 are then merged in conduit 11 and are passed through the reboiler 13 of a fractionating column 15 in which they are further cooled and partially condensed. Column 15 has the usual rectification trays 17.

The partially condensed mixture is then passed to a phase separator 19, in which a liquid fraction is separated from a remaining vapor fraction. The liquid fraction is removed through a conduit and is expanded through expansion valve 23 in which a vapor is flashed off the liquid. The mixed liquid and vapor are then introduced into a phase separator 25 in which a body of liquid and a body of vapor collect and are separately removed. The liquid is removed through a conduit 27, and a vapor is flashed off in an expansion valve 29. The mixed liquid and vapor are introduced at the appropriate composition level into fractionating column 15. The vapor from phase separator 25 is removed through a conduit 31, warmed by passage through heat exchanger 9 in heat exchange relationship with entering feed gas in branch conduit 5, compressed in recycle compressor 33 and reintroduced into conduit 1 for recycle with the feed gas.

Returning now to phase separator 19, the remaining vapor fraction of the feed mixture is removed from phase separator 19 through a conduit 35 and is further cooled and partially condensed in the heat exchanger 37. The partially condensed material is then introduced into a phase separator 39 and is separated into vapor and liquid phases. The liquid phase is removed through conduit 41 and a vapor is flashed from it through expansion valve 43, after which the mixed liquid and vapor join the mixed liquid and vapor in conduit 21 on the way toward phase separator 25.

The vapor from phase separator 39 is withdrawn through a conduit 45 and is returned to heat exchanger 37, where it is further cooled and partially condensed, to emerge from the exchanger 37 and be passed through a coil 47 in the base of an evaporator 49. The mixture in conduit 45 is further partially condensed in coil 47 and is fed into a phase separator 51, in which it is separated into liquid condensate and vapor portions. The vapor portion, rich in relatively lower boiling first component of the mixture, is withdrawn, through conduit 53, warmed by passage through exchanger 37, cooled by expansion with production of external work in expansion engine 55, and introduced into the shell side of exchanger 37, where it serves to cool incoming gas mixture. The vapor portion is then removed through a conduit 57, passed to the shell side of exchanger 7, withdrawn from exchanger 7 and compressed in a compressor 59. The product emerging from compressor 59 is recovered as the relatively lower boiling component of the mixture. That is to say, this component has the lower boiling point of the major components of the mixture.

Returning now to phase separator 51, the condensate, rich in relatively intermediate boiling, second component and containing relatively higher boiling third component, is removed from phase separator 51 to a conduit 61, passed from the cold end through to the warm end of exchanger 37 and is expanded through an expansion valve 63 in which further vapor rich in relatively lower boiling component is flashed from the liquid. The mixed liquid and vapor are introduced into a phase separator 65, in which the vapor and liquid are separated from each other, the vapor being withdrawn through conduit 67 and merged in conduit 31 for recycling with the vapor from phase separator 25. The liquid from phase separator 65 is expanded through expansion valve 75 and a vapor flashed therefrom, and the mixed liquid and vapor are introduced into evaporator 49, in which a body of liquid 77 is collected and maintained under subatmospheric pressure. Most of the liquid in the evaporator 49 is evaporated under subatmospheric pressure and withdrawn as vapor, rich in relatively intermediate boiling second component, through a conduit 83 and introduced into the cold end of heat exchanger 9, through which it passes on the shell side of the exchanger to be removed at the warm end of the exchanger and introduced into the low pressure stage of a compressor 85. Liquid residue, containing relatively higher boiling third component, is bled from evaporator 49 through a conduit 79 pumped to higher pressure in a pump 81 and introduced at its appropriate composition level in fractionating column 15.

The vapor overhead from fractionating column 15, also rich in relatively intermediate boiling second component, is withdrawn at superatmospheric pressure through a conduit 87 and passed through a separate passageway in heat exchanger 7 from the cold to the warm end thereof, to be then introduced into the intermediate pressure stage of compressor 85. The material in conduits 83 and 87 thus becomes intermingled and is raised to relatively high pressure, and emerges through a conduit 89 to be recovered as product, the relatively intermediate boiling, second component of the mixture.

The liquid bottoms from fractionating column 15, enriched in relatively higher boiling, third component of the mixture, are removed through a conduit 91, passed from the cold end to the warm end of exchanger 9 to cool the entering feed, compressed in compressor 93 and removed as purge gas, enriched in the relatively higher boiling product of the separation process.

A very important feature of this embodiment of the invention is the provision of evaporator 49 maintained at subatmospheric pressure. The pressure downstream of expansion valve 75 and upstream of the low pressure stage of compressor 85, in conduit 83, is thus subatmospheric, and the feed to evaporator 49, in conduit 69, is thus flashed to subatmospheric pressure and evaporation or boil-up from boil 47 is also conducted at subatmospheric pressure.

It has been found that evaporation at subatmospheric pressure greatly increases the thermal efficiency of the cycle and therefore greatly reduces the power requirements of the process. As a result of thus evaporating the liquid at subatmospheric pressure, the liquid is evaporated at a lower temperature than that at which it condensed. The temperature difference between the various streams at the warm and cold ends of the heat exchangers 7 and 9 is reduced, thus making the cycle more thermodynamically reversible and thus reducing the refrigeration load on the cycle.

The following is a specific example of operation according to the embodiment of FIGURE 1:

Feed gas enters the cycle through conduit 1 at a pressure of 617 p.s.i.a. and 40° F. with a composition of 88.68% hydrogen, 10.78% CO and 0.54% methane, which includes the recycle stream through conduit 31. The feed gas stream is divided and passed in parallel through exchangers 7 and 9 and recombined in conduit 11 with a temperature of $-292°$ F. After passage through the reboiler 13, the temperature is $-299°$ F.

The liquid fraction separated in phase separator 19 has a composition of 8.81% hydrogen, 76.65% CO and 14.54% methane. It has a temperature of $-299°$ F. and is at a pressure of 606 p.s.i.a. It is expanded through valve 23 to a temperature of $-303°$ F. and a pressure of 80 p.s.i.a. and introduced into phase separator 25, in which there separates out a liquid containing 1.06% hydrogen, 85.66% carbon monoxide and 13.28% methane. This latter liquid is expanded through valve 29 from a pressure of 80 p.s.i.a. to a pressure of 19 p.s.i.a. and a temperature of $-306°$ F. and is introduced in this condition into fractionating column 15. The vapor from phase separator 25 is recycled through conduit 31 and has a temperature of $-306°$ F., a pressure of 80 p.s.i.a., and a composition of 66.82% hydrogen, 32.99% CO and 0.19% methane.

Returning to phase separator 19, the remaining fraction of the feed mixture leaves this separator at 606 p.s.i.a. and $-299°$ F., and has a composition of 90.62% hydrogen, 9.18% CO and 0.20% methane. It is cooled in the warm end of heat exchanger 37 to a temperature of $-305°$ F. and a pressure of 604 p.s.i.a., partially condensed, and introduced into phase separator 39, in which there separates out a liquid that is removed through conduit 41 at $-305°$ F. and 604 p.s.i.a., with a composition of 8.36% hydrogen, 83.76% CO and 7.88% methane. This liquid is expanded through valve 43 to a temperature of $-309°$ F. and a pressure of 80 p.s.i.a. and is added to the material in conduit 21 on the way to phase separator 25.

The overhead from separator 39 has a temperature of $-305°$ F., a pressure of 604 p.s.i.a., and a composition of 91.98% hydrogen, 7.95% CO and 0.7% methane. It is reintroduced into exchanger 37 and is cooled in that exchanger to a temperature of $-322.2°$ F. at a pressure of 601 p.s.i.a., and partially condensed. In this condition, the mixture passes through coil 47, in which it is cooled to −330.5° F. and a pressure of 595 p.s.i.a., further partially condensed, and passed into phase separator 51. The vapor phase, at that same temperature, has a composition of 97.5% hydrogen and 2.5% carbon monoxide and is suitable for use as product hydrogen. It is removed from separator 51, expanded in expansion engine 55 to a pressure of 290 p.s.i.a. and a temperature of −333° F., warmed in exchanger 37 to a temperature of −304° F., and again in exchanger 7 to a temperature of 35° F. It is then compressed in compressor 59 to a pressure of 595 p.s.i.a. and has a temperature, following passage through the usual compressor aftercoolers, of 100° F., in which condition it is recovered as product hydrogen, the relatively lower boiling, normally gaseous first component of the mixture.

The condensate leaving phase separator 51 is at −330.5° F. and 595 p.s.i.a. and has a composition that is 6.94% hydrogen, 91.86% carbon monoxide and 1.20% methane. It is warmed in exchanger 37 to a temperature of −304° F., and is expanded in expansion valve 63 from 592 p.s.i.a. to 50 p.s.i.a., during the course of which it falls in temperature to −309° F. and leaves expansion valve 63 partly in liquid phase and partly in vapor phase. The vapor phase material that is separated in phase separator 65 has a temperature of −304° F., and a pressure of 50 p.s.i.a., and a composition that is 64.88% hydrogen, 35.11% carbon monoxide and 0.01% methane, and joins the recycle stream in conduit 31. The liquid from phase separator 65 leaves through conduit 69 at a temperature of −309° F. and a pressure of 50 p.s.i.a. and has a composition that is 1.03% hydrogen, 97.65% carbon monoxide and 1.32% methane. It is expanded in valve 75 to a pressure of 3.0 p.s.i.a. and a temperature of −333° F. in which condition it is partly in liquid and partly in vapor phase.

Another branch of the liquid from phase separator 65 is expanded through valve 73 from 49 p.s.i.a. to 18.5 p.s.i.a. and is introduced into the top of fractionating column 15 as liquid reflux.

The material in line 69 is then introduced into evaporator 49, and the liquid residue that is bled from the bottom of evaporator 49 is at −331.5° F. and 2.0 p.s.i.a. and has a composition that is 92.65% CO and 7.35% methane. This material is raised in pressure in pump 81 to 18.8 p.s.i.a. and a temperature of −330° F., and is introduced into column 15 at its appropriate composition level.

The vaporized condensate leaving evaporator 49 is at a temperature of −330.5° F. and a subatmospheric pressure of 2.8 p.s.i.a. and has a composition that is 1.00% hydrogen, 98.90% carbon monoxide and 0.10% methane. This vapor is then warmed in exchanger 9 to a temperature of 28° F. and is compressed in the low pressure stage of compressor 85. The overheads withdrawn from fractionating column 15 in conduit 87 are at a temperature of −310° F. and a superatmospheric pressure of 18.5 p.s.i.a. and have the same composition as the material in conduit 83. The overheads are warmed in exchanger 7 to a temperature of 28° F. at a pressure of 15.5 p.s.i.a. in which condition they enter the intermediate stage of compressor 85. The material finally leaving compressor 85 through conduit 89 is at a pressure of 310 p.s.i.a. and has a temperature of 100° F., allowing for aftercooling, and is recovered as product carbon monoxide, the relatively intermediate boiling, normally gaseous second component of the mixture. The material leaving the bottom of fractionating column 15 through conduit 91 is in liquid phase and has a pressure of 20 p.s.i.a., a temperature of −302.3° F., and a composition of 60% CO and 40% methane. This material is warmed and vaporized in exchanger 9 to 28° F., compressed in compressor 93 to a pressure of 225 p.s.i.a. and a temperature of 100° F., and vented from the system, enriched in methane, the relatively higher boiling, normally gaseous third component of the mixture.

Turning now to FIGURE 2, it will be seen that a modification of the embodiment of FIGURE 1 has been made, in which the liquid from phase separator 39 passes through conduit 95 and is expanded through expansion valve 97 from 604 p.s.i.a. to 80 p.s.i.a. whereby a vapor is flashed from the liquid. The mixed liquid and vapor is introduced into a phase separator 99 from which the liquid leaves through conduit 101 and is expanded through valve 103 from 80 p.s.i.a. to 2.8 p.s.i.a. so that a vapor is flashed in valve 103 and the mixed liquid and vapor is introduced into a fractionating column 105 at the appropriate composition level. Column 105 is provided with appropriate fractionating trays 107. Vapor from phase separator 99 leaves through conduit 109 and joins the vapor in conduit 31. Otherwise, the structure and operation of the cycle of FIGURE 2 are substantially the same as the structure and function of the cylce of FIGURE 1, it being noted that the use either of an evaporator 49 or of a fractionating column 105 as the subatmospheric evaporation zone is within the scope of the present invention.

With respect to the embodiment shown in FIGURE 3, feed bas mixture enters the system through a conduit 118 and passes into compressor 119, from which it emerges at elevated pressure to pass through conduit 120 to chiller 122, where it is cooled. The feed gas then passes via conduit 123 to enter one of two alternately operable driers 124, arranged to allow continuous operation of the process. Thus, one drier will be in operation while the other is out of service for reactivation. Suitable valve means 126 are provided to permit switching of the feed gas steram from one drier to the other. After leaving a drier 124, the feed gas continues through conduit 128 to begin its first pass through heat exchanger 130 to be cooled by returning gas streams. At a point intermediate its pass through exchanger 130, the feed gas is withdrawn through conduit 132 and passed through one of two parallel, alternately operable carbon dioxide adsorbers 134. Suitable valve means 136 are provided to permit alternate operation of the $CO_2$ adsorbers in a fashion similar to that of the driers 124, so that one adsorber can be taken out of service for reactivation without interrupting the process. After $CO_2$ is removed from the feed gas, the stream is returned via conduit 138 to finish its pass through heat exchanger 130.

The feed gas stream leaves the cold end of exchanger 130 by way of conduit 140 and is divided at point 141. One branch of the split feed stream passes through conduit 142 and is further cooled by acting as reboiler in coil 143 in phase separator 144. This branch emerges from separator 144 by way of conduit 146. The other branch continues from division point 141 on through conduit 148 to be further cooled by acting as reboiler in coil 149 in phase separator 150. This latter branch exits separator 150 in conduit 152 to rejoin the other branch stream at point 154.

The feed gas continues from point 154 on through conduit 156 and coil 157 to reboil liquid in the bottom of fractionating column 158, and is further cooled and partially condensed in the process. Column 158 has the usual rectification trays 155. Partially condensed feed gas mixture passes from column 158 through conduit 159 into phase separator 160 where a liquid fraction is separated from a remaining vapor fraction. The remaining vapor fraction from separator 160 passes through conduit 162 and enters heat exchanger 164 for further cooling and partial condensation. Intermediate its passage through exchanger 164, the mixture is extracted via conduit 166 to pass to coil 167, to reboil and be cooled by liquid refrigerant in evaporator 168. The gas mixture emerges from evaporator 168 and passes through conduit 170 to return to exchanger 164 to complete its pass.

The partially condensed mixture leaves exchanger 164 through conduit 172 and passes into coil 173 in refrigerant evaporator 174, where liquid refrigerant boiling under subatmospheric pressure effects further partial condensation of the mixture. From evaporator 174, the mixture in mixed-phase stream, passes via conduit 176 to phase separator 178. The vapor phase, rich in relatively lower boiling, normally gaseous first component, passes from phase separator 178 through conduit 180 to exchanger 164 where it serves to cool incoming gas, to emerge via conduit 182 and pass through exchanger 130 to assist in cooling entering feed gas. This vapor stream exists exchanger 130 through conduit 184 and is recovered as the relatively lower boiling, normally gaseous first component of the mixture.

Condensate remaining in separator 178 rich in relatively higher boiling, normally gaseous second component and also containing relatively still higher boiling, normally gaseous third component drains through conduit 186 to pass through exchanger 164, to emerge through conduit 188 to be passed through expansion valve 189 in which a further vapor rich in relatively lower boiling first component is flashed from the liquid with both phases being passed into separator 144.

Liquid bottoms from separator 160 are passed by way of conduit 190 and are flashed across valve 191 to form a mixed-phase stream which passes into separator 150. Vapors from separators 144 and 150 enriched in relatively lower boiling first component, exit through conduits 192 and 194 respectively to merge in conduit 196 and pass through exchanger 130 to serve to cool incoming feed gas. The vapor stream from conduit 196 exits exchanger 130 through conduit 198 and passes as recycle gas through recycle compressor 200 to rejoin the feed stream in conduit 120 at point 202.

The liquid bottoms from separator 144 are drained through conduit 204 and are divided at point 205, part passing through conduit 206 to act as reflux in fractionating column 158, and the remainder continuing through conduit 207 to be flashed across valve 208 and passed into phase separator 209. The liquid bottoms from separator 150 pass through conduit 151 are flashed across valve 210 and also enter separator 209.

Liquid bottoms from separator 209 drain through conduit 211 into coil 213 of refrigerant condenser 212 from where, after liquefying refrigerant, they return to separator 209 via conduit 214. Liquid bottoms from separator 209 also pass via conduit 215 into fractionating column 158 at an appropriate composition level. Thus, the overheads and the liquid bottoms from separator 209 both flow into the column 158, but at different locations.

The liquid at the bottom of fractionating column 158 is reboiled by the feed gas mixture passing through coil 157. Overheads from column 158 rich in relatively higher boiling, second component are withdrawn at superatmospheric pressure and pass through conduit 216 to exchanger 130, thereby serving to cool incoming gases. These overheads are withdrawn from the system through conduit 218 as the relatively higher boiling, normally gaseous second component of the mixture, and are recovered as a product of the fractionation.

Liquid bottoms in fractionating column 158 are drained through conduit 220 and are passed to exchanger 130, whereby they serve to cool incoming feed gas mixture, and are vaporized in the process. This vapor emerges from exchanger 130 by way of conduit 222 as a stream enriched in the relatively still higher boiling, third component of the mixture. This stream is divided at point 223, a portion being vented from the system as purge gas through conduit 224 and another portion being passed through conduit 225 into compressor 226. This latter portion, under elevated pressure is passed through conduit 227 to be chilled in refrigerator 228. From refrigerator 228, the gas passes through conduit 229 into phase separator 230. The overheads from this separator pass through conduit 231 and are returned to fractionating column 158 for reclamation. The liquid bottoms drain through conduit 232, rejoin the liquid bottoms from fractionating column 158 at point 233 and pass out through the exchanger 130.

In this embodiment of the invention, the refrigeration system which cools the feed gas in the evaporators is a closed cycle. The refrigerant is compressed in compressor 240 to a first superatmospheric pressure, passes through conduit 241 into suitable oil filtering apparatus 242 and through conduit 243 into exchanger 244, where it is cooled by heat interchange with returning refrigerant streams. From exchanger 244, the refrigerant passes by way of conduit 246 into coil 247 in the refrigerant condenser 212 where it is liquefied by heat exchange with liquid bottoms from separator 209. The refrigerant emerges from the refrigerant condenser 212 through conduit 248 and passes into refrigerant subcooling coil 250 in refrigerant evaporator 168. In coil 250, the refrigerant is subcooled by refrigerant vaporized in evaporator 168. The refrigerant from coil 250 is flashed across valve 251 to a second superatmospheric pressure and passes into evaporator 168 in that condition. The refrigerant that is vaporized emerges through conduit 252 into exchanger 244 and returns to the suction side of compressor 240 by way of conduit 254.

Liquid refrigerant in evaporator 168 flows through conduit 256 into refrigerant subcooling coil 258, where it is subcooled by refrigerant vaporized under subatmospheric pressure in evaporator 174. The liquid from coil 258 is flashed across valve 259 to a subatmospheric pressure and passes into refrigerant evaporator 174, where it is maintained under subatmospheric pressure. In evaporator 174, the refrigerant is vaporized under subatmospheric pressure, thereby serving to cool incoming gas mixture in coil 173, to effect partial condensation thereof. The vaporized refrigerant passes out of evaporator 174, subcooling incoming refrigerant in coil 258 en route, and exits through conduit 260, to pass through refrigerant exchanger 244. From refrigerant exchanger 244, the returning refrigerant passes through refrigerant vacuum pump 261 to join the refrigerant recycle stream in conduit 254 and return to the refrigerant compressor 240.

As a specific operating example of the embodiment of the invention according to FIGURE 3, feed gas mixture comprising, by volume, about 65% hydrogen, 34% carbon monoxide, 0.6% methane and the balance trace constituents, enters the system and is compressed to about 455 p.s.i.a. leaving compressor 119 at about 100° F. The rate of flow is about 1729 pound-mols per hours on a dry basis (14.90 MMSCFD). The feed gas then passes through ammonia chiller 122 to be cooled to about 35° F. The feed stream passes into exchanger 130 and is withdrawn therefrom through conduit 132 at about −115° F. for removal of $CO_2$. The feed gas finishes its pass through exchanger 130, to exit therefrom through conduit 140 and pass through coil 157 in fractionation column 158, emerging at −284° F. to enter the phase separator 160 at that temperature. The overheads from separator 160 pass to exchanger 164 for further cooling and partial liquefaction, are withdrawn through conduit 166 to pass through liquid nitrogen evaporator 168 and be cooled by liquid nitrogen which is vaporizing at 22 p.s.i.a.

The mixture re-enters exchanger 164 through conduit 170, emerges through conduit 172 and passes into coil 173 in evaporator 174, where it is cooled by liquid nitrogen boiling at a pressure of about 4.6 p.s.i.a. The feed stream having undergone further partial condensation in coil 173, is then passed into separator 178, which it enters at a pressure of about 440 p.s.i.a. and a temperature of about −334° F. Vapor rich in hydrogen (98.45% hydrogen, 1.50% carbon monoxide, balance trace elements) is passed out through conduit 180 to pass through exchanger 130, emerging at a temperature of about 30° F. and a pressure of about 415 p.s.i.a. to be recovered as product hydrogen.

The overheads from fractionating column 158, vapors rich in carbon monoxide (98.6% carbon monoxide, 0.1% hydrogen, 0.1% methane, balance trace elements), are removed from column 158 at a pressure of about 19 p.s.i.a. and a temperature of about −310° F. Those vapors are passed by way of conduit 216 out through exchanger 130, emerging therefrom at a temperature of about 30° F. and a pressure of about 16 p.s.i.a. to be recovered as product carbon monoxide.

Liquid bottoms from fractionating column 158 are withdrawn as a purge stream through exchanger 130, emerging as a vaporized stream at a temperature of about 30° F., that is divided at point 223, with about one-third being vented from the system through conduit 224, and about two-thirds continuing on as recycle. The purge stream has a composition of about 70% methane and 30% carbon monoxide, with traces of other constituents. The recycle purge stream is compressed in compressor 226 to about 1050 p.s.i.a., leaving at a temperature of about 96° F. to be cooled in ammonia chillers 228 to a temperature of about −120 F. The recycle purge gas is flashed to about 19 p.s.i.a. in separator 230, from which the overheads and bottoms pass to their respective locations in the system as set forth hereinabove.

The overheads leaving the tops of separators 144 and 150 emerge at a pressure of about 75 p.s.i.a., pass through exchanger 130 to exit therefrom at a temperature of about 30° F., are compressed in recycle compressor 200 to about 455 p.s.i.a. at a temperature of 86° F., in which condition they rejoin the feed stream in conduit 120.

The normally gaseous refrigerant, in this case nitrogen, is compressed in compressor 240 to a first superatmospheric pressure of about 45 p.s.i.a. at a temperature of about 100° F., and enters exchanger 244 in this condition. The nitrogen is liquefied in condenser 212, subcooled in cooling coil 250, and is flashed across valve 251 to enter evaporator 168 at a second superatmospheric pressure of about 22 p.s.i.a., at which pressure some of the liquid nitrogen is vaporized by the mixture in coil 167.

Liquid nitrogen drains from evaporator 168 to be further subcooled in coil 258, and flashed across valve 259 to enter evaporator 174 at a subatmospheric pressure of about 4.6 p.s.i.a. Vaporized nitrogen passing out of evaporator 174 returns through exchanger 244 and nitrogen vacuum pump 261, to rejoin the other returning nitrogen stream, both of which return to compressor 240 at about 16 p.s.i.a.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What I claim is:

1. Low temperature process for separating components of a gaseous mixture including a first component of relatively low boiling point, a second component of next lower boiling point and a third component of relatively higher boiling point, comprising the steps of
    compressing the gaseous mixture,
    cooling compressed gaseous mixture by heat interchange with relatively cold components of the gaseous mixture to effect partial liquefaction of the gaseous mixture and provide a first vapor and a first condensate,
    separating the first vapor from the first condensate,
    cooling the first vapor without rectification, by heat interchange with a relatively cold extraneous refrigerant to effect its partial liquefaction and provide a second vapor consisting essentially of the first component and a second condensate,
    separating the second vapor from the second condensate,
    warming and expanding and partially evaporating the second condensate to produce a third vapor and a third condensate,
    separating the third vapor from the third condensate,
    introducing third condensate into a fractionating zone and separating third condensate into a fourth vapor consisting essentially of the second component and a fourth condensate, collecting in the zone,
    and passing the second vapor and the fourth vapor in heat interchange with the compressed gaseous mixture to effect at least part of the cooling of the compressed gaseous mixture.

2. Low temperature process as defined in claim 1 in which the extraneous refrigerant comprises a liquefied gas under subatmospheric pressure.

3. Low temperature process as defined in claim 1 in which the first condensate is expanded, partly evaporated and then introduced into the fractionating zone.

4. Low temperature process as defined in claim 3 in which the third vapor is warmed upon heat interchange with the compressed gaseous mixture, compressed and then added to the warm compressed gaseous mixture.

5. Low temperature process as defined in claim 4 in which vapor produced by partial evaporation of the first condensate is warmed by heat interchange with compressed gaseous mixture, compressed and then added to the warm compressed gaseous mixture.

6. Low temperature process as defined in claim 5 in which the fourth condensate is vaporized upon heat interchange with compressed gaseous mixture, compressed, partly liquefied to provide a vapor portion and the vapor portion is fed to the fractionating zone.

7. Low temperature process as defined in claim 6 in which the compressed gaseous mixture is passed in heat interchange with fourth condensate prior to separation of the gaseous mixture into the first vapor and the first condensate.

8. Low temperature process as defined in claim 7 in which the first component is hydrogen, the second component is carbon monoxide and the third component is methane and in which
    the refrigerant is liquefied nitrogen under subatmospheric pressure.

References Cited

UNITED STATES PATENTS

| | | | |
|---|---|---|---|
| 2,591,658 | 4/1952 | Haringhuizen | 62—23 |
| 3,020,723 | 2/1962 | De Lury et al. | 62—40 XR |
| 3,095,294 | 6/1963 | Knapp et al. | 62—24 XR |
| 3,107,992 | 10/1963 | Sellmaier | 62—40 XR |
| 3,224,207 | 12/1965 | Feist | 62—40 XR |
| 3,271,965 | 9/1966 | Maher et al. | 62—40 XR |
| 3,339,371 | 9/1967 | Ichihara | 62—23 XR |
| 3,370,435 | 2/1968 | Arregger | 62—28 |

WILBUR L. BASCOMB, JR., Primary Examiner

U.S. Cl. X.R.

62—26, 28, 31, 40

PO-1050
(5/69)

UNITED STATES PATENT OFFICE
CERTIFICATE OF CORRECTION

Patent No. 3,508,413　　　　　　　　　　Dated April 28, 1970

Inventor(s)　　　　J. A. PRYOR

It is certified that error appears in the above-identified patent and that said Letters Patent are hereby corrected as shown below:

```
Col. 4, line 17, "boil"   should be -- coil --
Col. 6, line 19, "cylce"  should be -- cycle --
Col. 6, line 25, "bas"    should be -- gas --
Col. 6, line 34, "steram" should be -- stream --
Col. 7, line 12, "exists" should be -- exits --
Col. 8, line 49, "hours"  should be -- hour --
```

SIGNED AND
SEALED
SEP 15 1970

(SEAL)
Attest:

Edward M. Fletcher, Jr.
Attesting Officer

WILLIAM E. SCHUYLER, JR.
Commissioner of Patents